Nov. 1, 1932.  L. DE FOREST  1,885,900
TALKING MOTION PICTURE ATTACHMENT
Original Filed Dec. 22, 1928

Inventor
Lee DeForest
By David Pelton Moore
Attorney

Patented Nov. 1, 1932

1,885,900

UNITED STATES PATENT OFFICE

LEE DE FOREST, OF HOLLYWOOD, CALIFORNIA, ASSIGNOR TO GENERAL TALKING PICTURES CORPORATION, OF NEW YORK, N. Y., A CORPORATION OF DELAWARE

TALKING MOTION PICTURE ATTACHMENT

Original application filed December 22, 1928, Serial No. 327,787. Divided and this application filed October 30, 1931. Serial No. 572,167.

The present invention relates to improvements in talking motion picture attachments, the present application being a division of my application filed December 22, 1928, Serial No. 327,787.

One object of the present invention is the provision of a combined switch and film clamp operating device whereby simultaneously with the clamping of the rollers upon the film the motor circuit to the motion picture apparatus is closed and the apparatus therefore started in motion; the actuation of the switch to the reverse position opening the motor circuit and also freeing the film.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of the claims without departing from the spirit of the invention.

Figures 1, 2:
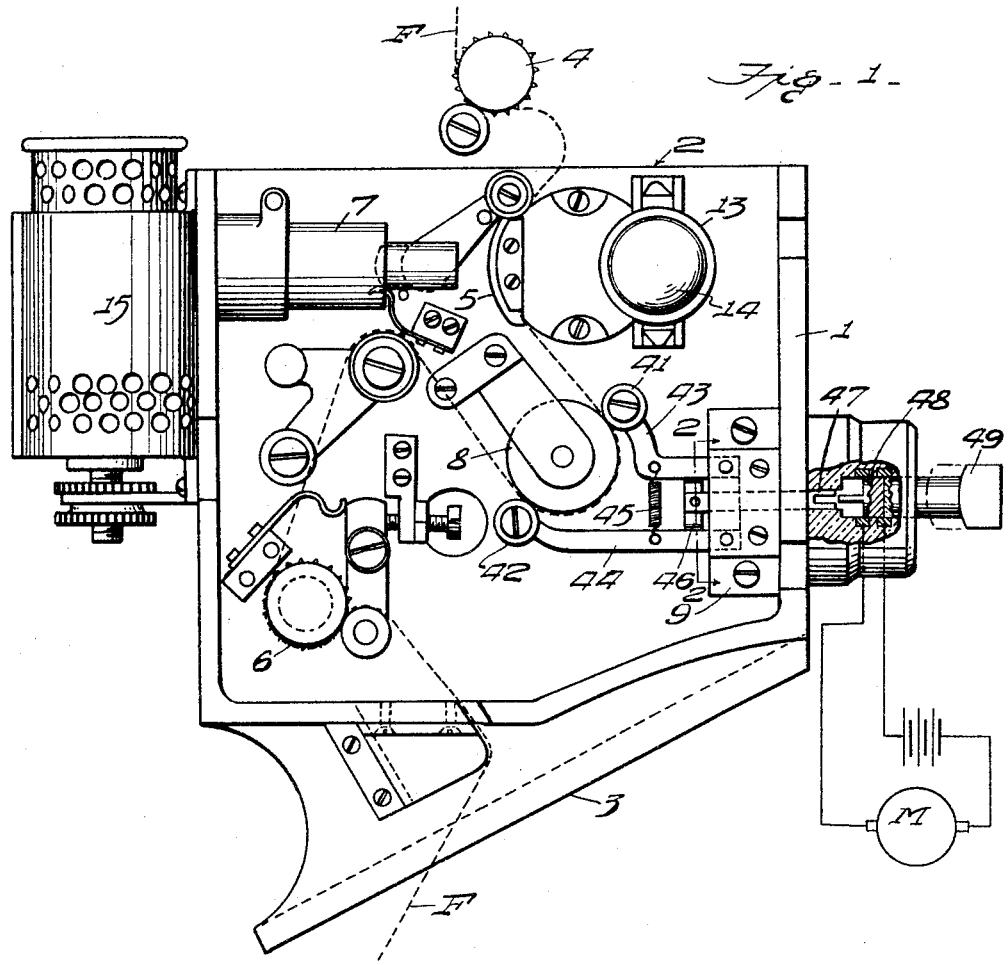
Figure 1 is the side elevation, with the door removed, of a sound-on-film attachment made according to and embodying the present invention, an electrical diagram being shown leading from the switch to an electric motor.
Figure 2 is an enlarged detailed sectional view through the switch and cam actuator, dotted lines illustrating the position the parts assume when the arms are in outstretched position and the circuit is open.

Referring to the drawing:

The numeral 1 designates the casing for the attachment which in turn is provided with the motion picture projector supporting edge 2 and the magazine supporting edge 3, thus providing a means whereby this attachments constitutes a support for the projector and for the lower magazine and so that the film F may be threaded through as indicated from the constant speed sprocket 4 of the motion picture projector apparatus. Mounted within the casing 1 is a slit-block 5 and mounted in the lower part of casing 1 is a second constant speed sprocket 6. Optical system 7 is mounted also in the casing and below the slit-block 5 is mounted a roller 8 which is cylindrical and is adapted to be rotated by the film F as the same is drawn there-over. Carried by the casing 1 is a support 9 in which is journalled for oscillatory movement a stem or shaft 47, the inner end of which is provided with a cam 46 so that when the same is oscillated the arms 43 and 44 may be moved outwardly against the action of the spring 45 or be withdrawn by said spring toward each other. In the outer end of each of the respective arms 43 and 44 are rollers 41 and 42 respectively which are adapted to engage the film F at diametrically opposite points upon the roller 8. Mounted upon the exterior of casing 1 is a snap-switch 48 with a button 49, the inner end of botton 49 being removably attached to the outer end of the shaft or stem 47 so that when the button 49 is energizing the motor M the cam 46 will be moved to permit the spring 45 to bring the arms 43 inwardly and into engagement with the film F. This energization of the motor then causing the motion picture machine and the constant speed sprockets heretofore described to be operated to move the film through the projector and the soundhead. When the button 49 is moved in the opposite direction so that the cam speeds the arms 43 and 44 apart and against the action of the spring 45, the motor circuit is opened and in consequence thereof the mechanisms operated thereby will be halted.

There is usually mounted within the slit-block 5 within its receptacle 13 a photo-electric cell 14 so that light projected from the exciter lamp 15 and the optical system 7 will be projected upon and through the film F as the same passes over the slit-block, so that the photo-electric cell will be affected in the usual manner.

Thus, in this construction the attachment is provided with a light station, a lamp for supplying light at said station and with the drive motor M in combination with the rotatable means for causing a film to travel past said light station, said light station, as heretofore described, being a slit-block and the photo-electric cell mounted therein being the light sensitive element. This part of the mechanism in the sound-on-film apparatus being of usual and common construction and the main feature in the present device being the switch or means actuated by the shifting means to control the motor circuit.

What is claimed is:

1. In sound recording and reproducing apparatus, the combination of a light station, a lamp for supplying light at said station, and a driving motor, rotatable means for causing a film to travel past said light station, a light sensitive element at said station for receiving the film modulated light, shiftable means for normally retaining said film in engagement with said rotatable means, manually operable means for shifting said retaining means into and out of operative position, and means actuated by said shifting means to control the motor circuit.

2. In sound recording and reproducing apparatus, the combination of a light station, a lamp for supplying light at said station, a driving motor, rotatable means for causing a film to travel past said light station, a light sensitive element at said station for receiving the film modulated light, manually operable shiftable means for normally retaining said film in engagement with said rotatable means, means for shifting said retaining means into and out of operative position, switch in the motor circuit, and means actuated by said shifting means to close and open said switch when the retaining means is in operative and inoperative position respectively.

3. In a sound recording and reproducing apparatus as set forth in claim 1, wherein the manually operable means for shifting the retaining means includes a slidable and rotatable stem having a finger piece, and a switch controlled by the same and operable to closed position when the retaining means is moved into retaining position to close the motor circuit and when moved to release the retaining means opens the motor circuit.

4. In a sound recording and reproducing apparatus as set forth in claim 1 in which the means for shifting said retaining means includes an oscillatory shaft provided with a cam member upon one end and with a recess upon the other end and a longitudinally slidable and rotatable member aligned therewith and provided with means for engaging the recess to connect the two, and a switch for the motor circuit operably connected to the latter member.

5. In sound recording and reproducing apparatus, the combination of a light station, a lamp for supplying light at said station, and a driving motor, rotatable means for causing a film to travel past said light station, a light sensitive element at said station for receiving the film modulated light, shiftable means for normally retaining said film in engagement with said rotatable means, means for shifting said retaining means into and out of operative position, and means actuated by said shifting means to control the motor circuit.

In testimony whereof I affix my signature.

LEE DE FOREST.